United States Patent
Jackson et al.

(10) Patent No.: US 9,719,624 B2
(45) Date of Patent: Aug. 1, 2017

(54) LINE STOP DISC

(71) Applicant: CTG, Inc., Houston, TX (US)

(72) Inventors: Cory Jackson, Houston, TX (US); Jason Jackson, Houston, TX (US)

(73) Assignee: CTG, INC., Houston, TX (US)

( * ) Notice: Subject to any disclaimer, the term of this patent is extended or adjusted under 35 U.S.C. 154(b) by 0 days.

(21) Appl. No.: 14/989,438

(22) Filed: Jan. 6, 2016

(65) Prior Publication Data
US 2017/0191599 A1    Jul. 6, 2017

(51) Int. Cl.
| | |
|---|---|
| F16L 55/10 | (2006.01) |
| F16L 55/105 | (2006.01) |
| F16L 55/18 | (2006.01) |
| F16L 55/07 | (2006.01) |
| F16L 41/06 | (2006.01) |

(52) U.S. Cl.
CPC ............ *F16L 55/105* (2013.01); *F16L 41/06* (2013.01); *F16L 55/07* (2013.01); *F16L 55/18* (2013.01)

(58) Field of Classification Search
CPC ................................ F16L 55/124; F16J 15/166
USPC .............................. 138/89, 94, 94.1; 277/437
See application file for complete search history.

(56) References Cited

U.S. PATENT DOCUMENTS

| | | | | |
|---|---|---|---|---|
| 2,677,581 A | * | 5/1954 | Taylor, Jr. ............. | F04B 53/143 277/437 |
| 3,025,885 A | * | 3/1962 | Ver Nooy ............. | F16L 55/105 138/94 |
| 3,626,475 A | * | 12/1971 | Hicks ...................... | F16K 51/00 138/94 |
| 3,719,366 A | * | 3/1973 | Pippert .................. | F16J 15/166 277/562 |
| 3,763,896 A | * | 10/1973 | Horne ....................... | E03F 9/00 138/89 |
| 5,004,513 A | * | 4/1991 | Bemis .................... | B29C 70/086 156/191 |
| 5,028,056 A | * | 7/1991 | Bemis .................... | B29C 70/086 138/89 |
| 5,499,826 A | * | 3/1996 | Pippert .................... | D04C 1/06 277/437 |
| 6,164,659 A | * | 12/2000 | Netzer .................... | F16F 9/362 188/322.18 |
| 7,325,573 B2 | * | 2/2008 | Coscarella ............... | F16L 55/11 138/89 |
| 7,849,882 B1 | * | 12/2010 | Lee ........................ | F16L 55/124 138/89 |

* cited by examiner

*Primary Examiner* — Patrick F Brinson
(74) *Attorney, Agent, or Firm* — Shawn Hunter

(57) ABSTRACT

A line stop disc for use in sealing off the flowbore of a pipeline being repaired. The line stop disc includes an estoppel cup, which forms a seal, and a reinforcing disc which is formed of a material having a greater tensile strength than that forming the estoppel cup.

13 Claims, 4 Drawing Sheets

LINE STOP DISC

BACKGROUND OF THE INVENTION

1. Field of the Invention

The invention relates generally to the design of line stop discs used to close off the bores of pipes during repair.

2. Description of the Related Art

Line stop repairs are repairs made in pipelines that are active and under pressure. Line stop repairs use hot tapping to intervene in the pipeline. Hot tapping is done by first constructing a branch line which will redirect fluid flow around the portion of the pipeline that requires repair. Then the pipeline is cut into and the flowbore of the pipeline is plugged with a line stop to redirect the flow through the branch line. Thereafter, repairs are conducted. An example of a hot tapping operation is found in U.S. Pat. No. 8,286,655 issued to Farrelly.

In order to plug the pipeline, a line stop disc is inserted into the flowbore. The line stop disc is directly exposed to the piped fluid. Hot tapping is problematic in instances where the pipeline carries heated fluid under high pressure. Piped liquids can often be at temperatures of 400°-500° F. Steam or hot liquid quickly degrades a flexible line stop disc that is formed of elastomer and/or fabric. Thermoplastics can melt or otherwise fail. The use of an all metal disc is more expensive and has problems creating the sealing needed to close off the pipeline.

SUMMARY OF THE INVENTION

The invention provides a line stop disc that will effectively close off the flowbore of a pipeline during a hot tapping operation. An exemplary line stop disc is described which includes an estoppel cup formed of a flexible elastomer. The estoppel cup includes a circumferential outer side surface which will form a seal against the interior wall of the pipeline flowbore. A reinforcing disc is affixed to the estoppel cup. Preferably, an adhesive is used to affix the reinforcing disc to the estoppel cup. The reinforcing disc is formed of a material having a greater tensile strength than the material making up the estoppel cup. The reinforcing disc is preferably formed of an aramid synthetic fiber fabric with high tensile strength and which is bonded with high-temperature resistant elastomer. In accordance with particularly preferred embodiments, the aramid synthetic fiber comprises KEVLAR® brand fabric.

During a hot tapping operation, the line stop disc is inserted into flowbore of the pipeline to block flow through the portion of the pipeline to be repaired. The line stop disc will be incorporated into a line stop insertion mechanism so that the reinforcing disc will face the active, or pressurized, side of the flowbore. The tensile strength of the reinforcing disc will help prevent the line stop disc from degrading in response to high temperatures and pressures. The line stop disc is incorporated into a line stop insertion mechanism by affixing it to a line stop head which is inserted into the flowbore of a pipeline and rotates to cause the line stop disc to seal off the flowbore. In preferred embodiments, the line stop disc is secured between the line stop head and a roller end piece.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein.

DETAILED DESCRIPTION OF THE PREFERRED EMBODIMENTS

Figure 1:
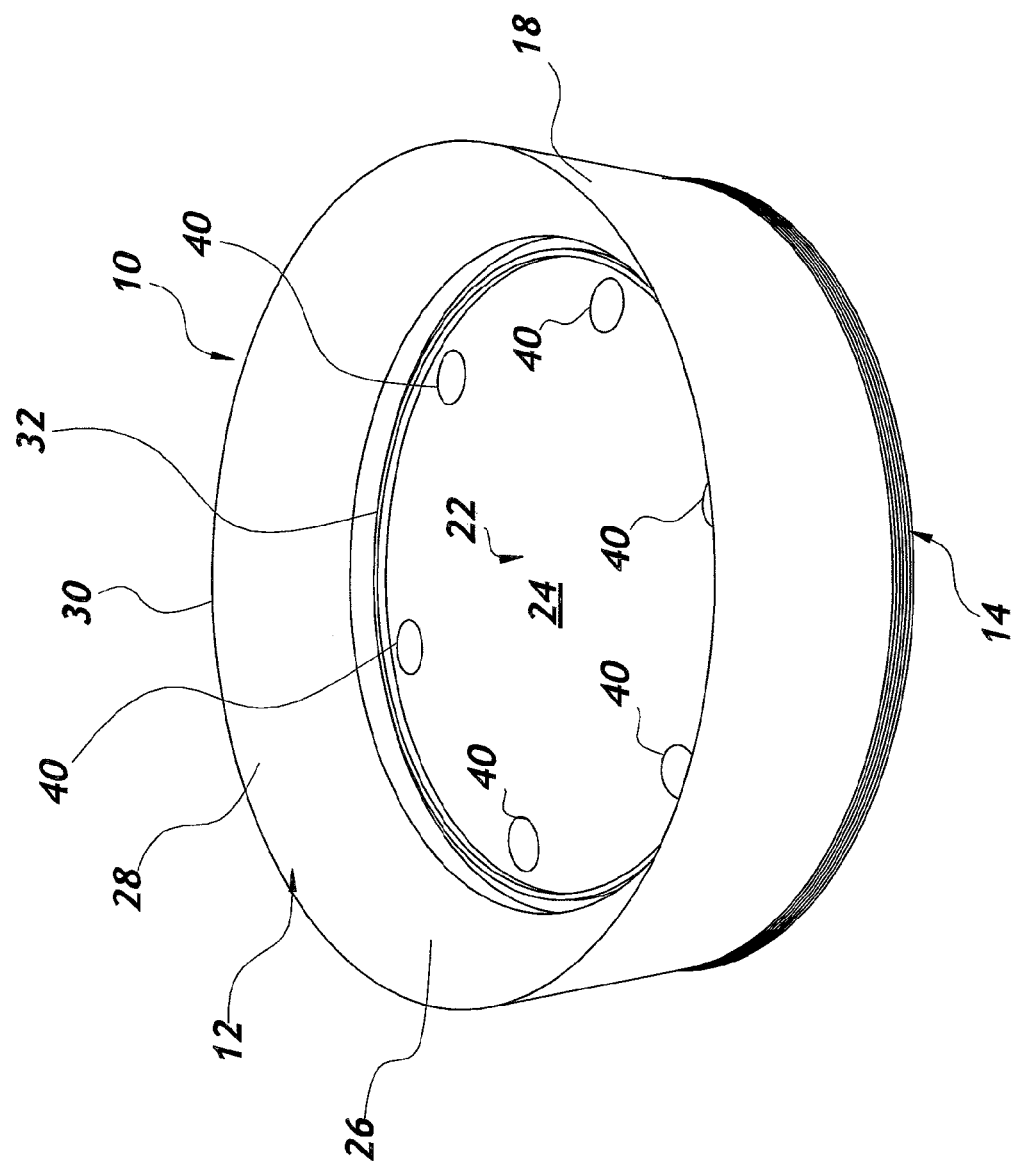
FIG. 1 is an external, isometric view of an exemplary line stop disc constructed in accordance with the present invention.
Figure 2:
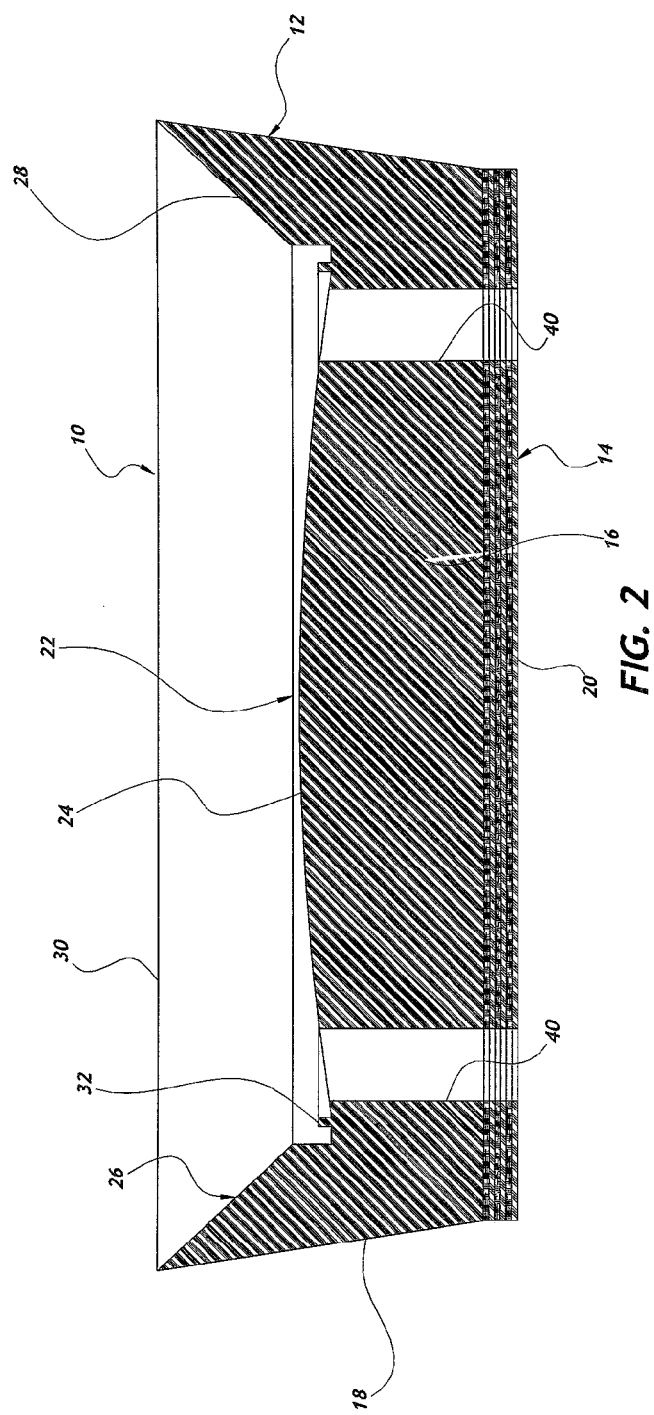
FIG. 2 is a side, cross-sectional view of the line stop disc of FIG. 1.

FIGS. 1 and 2 depict an exemplary line stop disc 10 which includes an estoppel cup 12 and a reinforcing disc 14. The estoppel cup 12 is secured to the reinforcing disc 14 by a suitable adhesive. In accordance with a preferred embodiment, adhesive is applied to the reinforcing disc 14 and is activated during the vulcanization process of the two substrates.

The estoppel cup 12 includes a circular base 16 with an outer circumferential side surface 18. In accordance with preferred embodiments, the outer circumferential side surface 18 is outwardly angled. The bottom axial side 20 of the estoppel cup 12 is preferably flat. In operation, the side surface 18 of the estoppel cup 12 is the portion of the estoppel cup 12 which seals against the interior surface of the flowbore of a pipeline.

The upper axial side 22 of the estoppel cup 12 is shaped to provide features which will assist with sealing and/or pressure resistance. The estoppel 12 has a reduced height central portion 24. The central portion 24 is preferably curved downwardly from its center to present a domed profile. A raised circumferential portion 26 radially surrounds the central portion 24. The raised circumferential portion 26 preferably presents a slanted inner face 28 and terminates in an edge 30 that is formed between the outer side surface 18 and the inner face 28. A raised ridge 32 radially surrounds the central portion 24 inside of the raised circumferential portion 24. The ridge 32 functions to keep the seal within openings 40 when bolts are used to connect the line stop disc 10 to a line stop head. The estoppel cup 12 is formed of a flexible material. It is preferred that the estoppel cup 12 is formed of a resilient elastomeric material, such as an AFLAS® fluoroelastomer.

Figure 3:
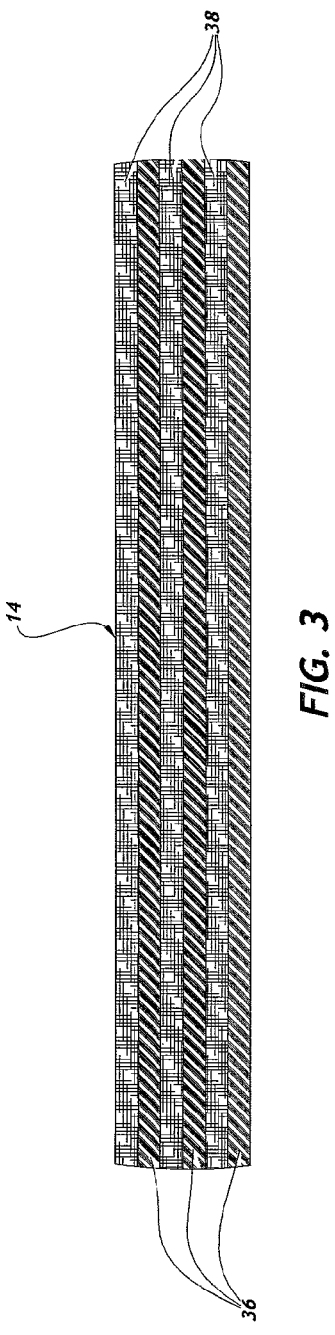
FIG. 3 is a side, cross-sectional view of the reinforcing disc portion of the line stop disc of FIGS. 1-2.

The reinforcing disc 14 is formed of a material which has a greater tensile strength than the estoppel cup 12. It is preferred, that the reinforcing disc 14 be formed of a flexible material. Further, the reinforcing disc 14 is preferably formed of multiple layers of elastomer and aramid synthetic fiber fabric. FIG. 3 depicts alternating layers 36 of elastomer and layers 38 of aramid synthetic fiber fabric which make up the reinforcing disc 14. In preferred embodiments, the elastomer in layers 36 is AFLAS fluoroelastomer. Also in preferred embodiments, the aramid synthetic fiber used to make up the fabric in layers 38 is KEVLAR® brand fabric. The layers 36, 38 are bonded together.

Figure 4:
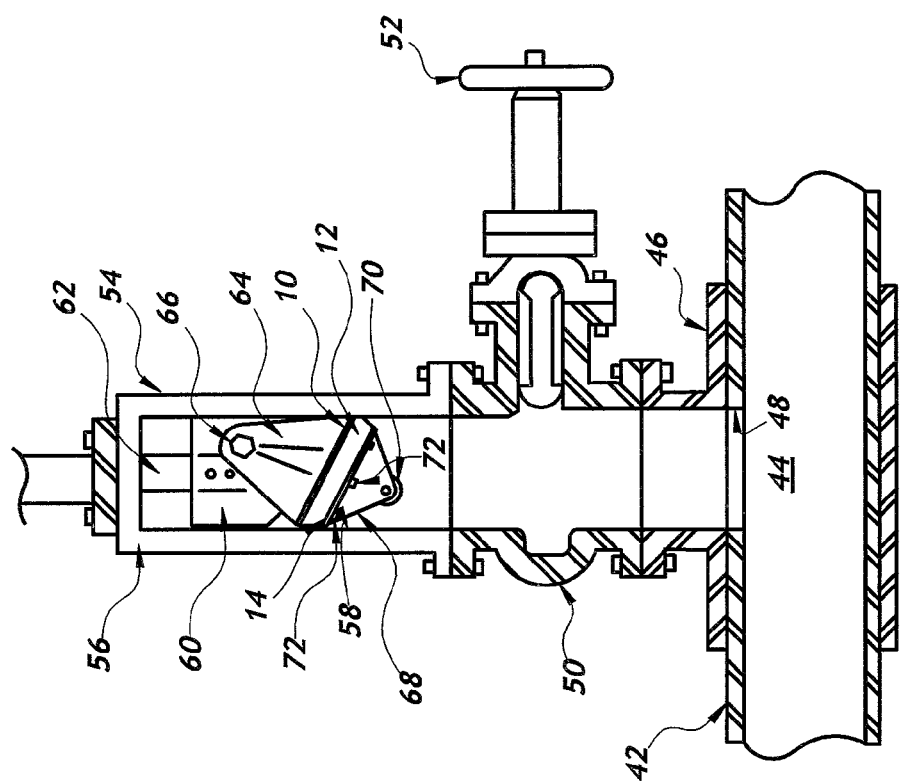
FIG. 4 is a side, cross-sectional view of an exemplary line stop about to be inserted into a pipeline during a hot tapping operation.
Figure 5:
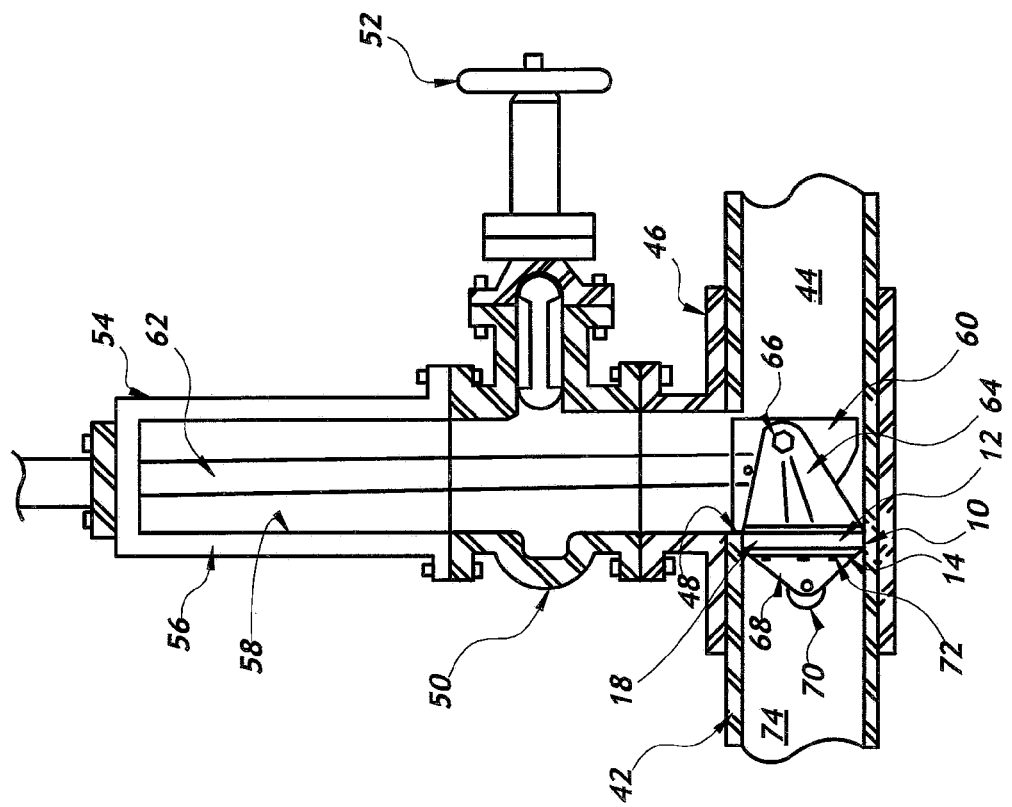
FIG. 5 is a side, cross-sectional view of an exemplary line stop now having been inserted into a pipeline during a hot tapping operation.

Openings 40 are formed in the line stop disc 10 so that the line stop disc 10 can be secured to a line stop placement head using threaded bolts (72) or the like. FIGS. 4 and 5 depict an exemplary line stop disc 10 incorporated into a line stop insertion mechanism and being used to close off the flowbore of a pipeline. Pipeline 42 having flowbore 44 is shown surrounded by an isolation collar 46. A lateral opening 48 has previously been cut into the pipeline 42 using a tapping machine. A closure valve 50 is affixed to the isolation collar 46. The closure valve 50 is shown in the open position, but those of skill in the art will understand that the closure valve 50 could be closed by rotation of wheel 52.

A line stop insertion mechanism 54 is affixed to the closure valve 50. The depicted line stop insertion mechanism 54 includes an outer housing 56 which defines a piston chamber 58. A piston 60 is mounted upon placement shaft 62. In FIG. 4, the piston 60 is located within the piston chamber 58, and both the piston 60 and shaft 62 are movable with respect to the housing 56. A line stop head 64 is affixed to the piston 60 by pivoting connection 66. The line stop insertion mechanism 54 preferably includes a rolling end piece 68 having a roller 70 which is designed to contact and roll upon the surface of the flowbore 44 during insertion of the line stop disc 10. Threaded bolts 72 interconnect roller end piece 68, line stop disc 10 and line stop head 64.

As the line stop head 64 is disposed into the flowbore 44 of the pipeline, as shown in FIG. 5, it rotates upon the pivoting connection 66 to allow the line stop disc 10 to seal off the flowbore 44. As can be seen by reference to FIG. 5, the line stop insertion mechanism 54 will insert the line stop disc 10 into the flowbore 44 so that the reinforcing disc 14 is facing the pressurized side 74 of the flowbore 44. The circumferential side surface 18 will seal against the flowbore 44.

The inventors have determined that a line stop disc which is constructed in accordance with the present invention is highly effective in sealing off a pipeline flowbore. Additionally, they have found that a line stop disc constructed in accordance with the present invention is less prone to failure even than more expensive, largely metal line stop discs which would be expected to be stronger and more robust in high temperature, high pressure environments. The inventors believe that the tensile strength provided by the reinforcing disc 14 prevents the estoppel cup 12 from breaking down.

Those of skill in the art will recognize that numerous modifications and changes may be made to the exemplary designs and embodiments described herein and that the invention is limited only by the claims that follow and any equivalents thereof.

What is claimed is:

1. A line stop disc for use in sealing off a flowbore of a pipeline, the line stop disc comprising:
   an estoppel cup which presents a circumferential side surface which forms a seal against the flowbore, the estoppel cup being formed of a first material; and
   a reinforcing disc affixed to the estoppel cup, the reinforcing disc being formed of a second material which has a greater tensile strength than the first material, the second material including a synthetic aramid fiber material that is formed into a fabric.

2. The line stop disc of claim 1 wherein:
   the first material comprises elastomer; and
   the second material comprises a combination of elastomer and synthetic aramid fiber material.

3. The line stop disc of claim 2 wherein the second material comprises alternating layers of elastomer and synthetic aramid fiber.

4. The line stop disc of claim 1 further comprising at least one opening disposed through the estoppel cup and the reinforcing disc through which threaded connectors can be disposed to affix the line stop disc to a line stop head.

5. The line stop disc of claim 1 wherein the estoppel cup and the reinforcing disc are affixed to each other by an adhesive.

6. A line stop disc for use in sealing off a flowbore of a pipeline, the line stop disc comprising:
   an estoppel cup which presents a circumferential side surface which forms a seal against the flowbore, the estoppel cup being formed of a first material; and
   a reinforcing disc affixed to the estoppel cup, the reinforcing disc being formed of a second material which at least partially includes alternating layers of elastomer and synthetic aramid fiber material that is formed into a fabric.

7. The line stop disc of claim 6 wherein the first material comprises elastomer.

8. The line stop disc of claim 6 wherein the second material has a greater tensile strength than the first material.

9. The line stop disc of claim 6 wherein the estoppel cup and the reinforcing disc are affixed to each other by an adhesive.

10. A line stop disc for use in sealing off a flowbore of a pipeline, the line stop disc comprising:
    an estoppel cup which presents a circumferential side surface which forms a seal against the flowbore, the estoppel cup being formed of a first material which at least partially includes elastomer; and
    a reinforcing disc affixed to the estoppel cup, the reinforcing disc being formed of a second material which at least partially includes synthetic aramid fiber material formed into fabric.

11. The line stop disc of claim 10 wherein the second material has a greater tensile strength than the first material.

12. The line stop disc of claim 10 wherein the second material further comprises alternating layers of elastomer and synthetic aramid fiber.

13. The line stop disc of claim 10 wherein the estoppel cup and the reinforcing disc are affixed to each other by an adhesive.

* * * * *